(12) United States Patent
Vanderhoof et al.

(10) Patent No.: US 12,338,352 B2
(45) Date of Patent: Jun. 24, 2025

(54) DRY ERASE INKS, AND ASSOCIATED METHODS AND WRITING INSTRUMENTS

(71) Applicant: Sanford L.P., Atlanta, GA (US)

(72) Inventors: Russell Andrew Vanderhoof, Joliet, IL (US); Wing Sum Vincent Kwan, Alpharetta, GA (US)

(73) Assignee: Sanford L.P., Atlanta, GA (US)

( * ) Notice: Subject to any disclaimer, the term of this patent is extended or adjusted under 35 U.S.C. 154(b) by 970 days.

(21) Appl. No.: 17/413,159

(22) PCT Filed: Dec. 13, 2019

(86) PCT No.: PCT/US2019/066179
§ 371 (c)(1),
(2) Date: Jun. 11, 2021

(87) PCT Pub. No.: WO2020/123914
PCT Pub. Date: Jun. 18, 2020

(65) Prior Publication Data
US 2022/0064464 A1    Mar. 3, 2022

Related U.S. Application Data

(60) Provisional application No. 62/779,541, filed on Dec. 14, 2018.

(51) Int. Cl.
*C09D 11/17*    (2014.01)
*B43K 1/01*    (2006.01)
*B43K 8/03*    (2006.01)

(52) U.S. Cl.
CPC .............. *C09D 11/17* (2013.01); *B43K 1/01* (2013.01); *B43K 8/03* (2013.01)

(58) Field of Classification Search
CPC ............. C09D 11/17; B43K 1/01; B43K 8/03
See application file for complete search history.

(56) References Cited

U.S. PATENT DOCUMENTS

| | | | |
|---|---|---|---|
| 3,949,132 | A | 4/1976 | Seregely et al. |
| 5,304,587 | A | 4/1994 | Oswald et al. |
| 5,655,847 | A | 8/1997 | Kobayashi et al. |
| 7,981,210 | B2 | 7/2011 | Kwan et al. |

(Continued)

FOREIGN PATENT DOCUMENTS

| | | |
|---|---|---|
| CN | 102076794 A | 5/2011 |
| EP | 2468828 A1 | 6/2012 |

(Continued)

OTHER PUBLICATIONS

English machine translation of KR-20010097797-A (Year: 2001).*

(Continued)

*Primary Examiner* — Jennifer A Smith
*Assistant Examiner* — Jeffrey Eugene Barzach
(74) *Attorney, Agent, or Firm* — Eversheds Sutherland (US) LLP

(57) ABSTRACT

Dry erase ink formulations containing at least one colorant encapsulated in a plurality of capsules wherein the capsules comprise a release agent, methods of erasing dry erase ink formulations, and writing instruments including a writing tip portion connected to a tubular member or refill and a dry erase ink formulation are provided herein.

15 Claims, 1 Drawing Sheet

(56) References Cited

U.S. PATENT DOCUMENTS

| | | | | |
|---|---|---|---|---|
| 2005/0124726 A1* | 6/2005 | Yatake | ............... | C09D 11/30 |
| | | | | 523/160 |
| 2009/0020036 A1* | 1/2009 | Ganapathiappan | ... | C08F 265/06 |
| | | | | 526/348 |
| 2010/0063186 A1* | 3/2010 | Onyenemezu | ......... | C09D 11/17 |
| | | | | 524/114 |
| 2012/0114880 A1* | 5/2012 | Nagoshi | ............... | D21H 19/822 |
| | | | | 428/32.33 |
| 2020/0251238 A1* | 8/2020 | Aizawa | ............... | H01B 7/36 |

FOREIGN PATENT DOCUMENTS

| | | | |
|---|---|---|---|
| EP | 3042942 A1 | | 7/2016 |
| JP | 2005132884 A | | 5/2005 |
| JP | 2006022213 A | | 1/2006 |
| JP | 2015028175 A | * | 2/2015 |
| KR | 20010097797 A | * | 11/2001 |
| WO | 2010030451 A1 | | 3/2010 |
| WO | 2013065653 A1 | | 5/2013 |

OTHER PUBLICATIONS

English machine translation of JP-2015028175-A (Year: 2015).*

Syahir, A.Z., et al. "A review on bio-based lubricants and their applications." Journal of Cleaner Production, vol. 168, Sep. 11, 2017, pp. 997-1016, https://doi.org/10.1016/j.jclepro.2017.09.106. (Year: 2017).*

International Search Report and Written Opinion for International Application No. PCT/US2019/066179 mailed Feb. 27, 2020 (8 pages).

EPO, "Extended European Search Report" Application No. 19897061.8, mailed Jul. 26, 2022, 5 pages.

CNIPA, "Notification of Reexamination", CN Application No. 2019800817579, dated Dec. 9, 2024, 15 pages.

"压敏胶技术" (translated as Pressure Sensitive Adhesive Technology), Keiji Fukuzawa, p. 67, New Times Press, 1st edition, 1st printed in Jun. 1985.

* cited by examiner

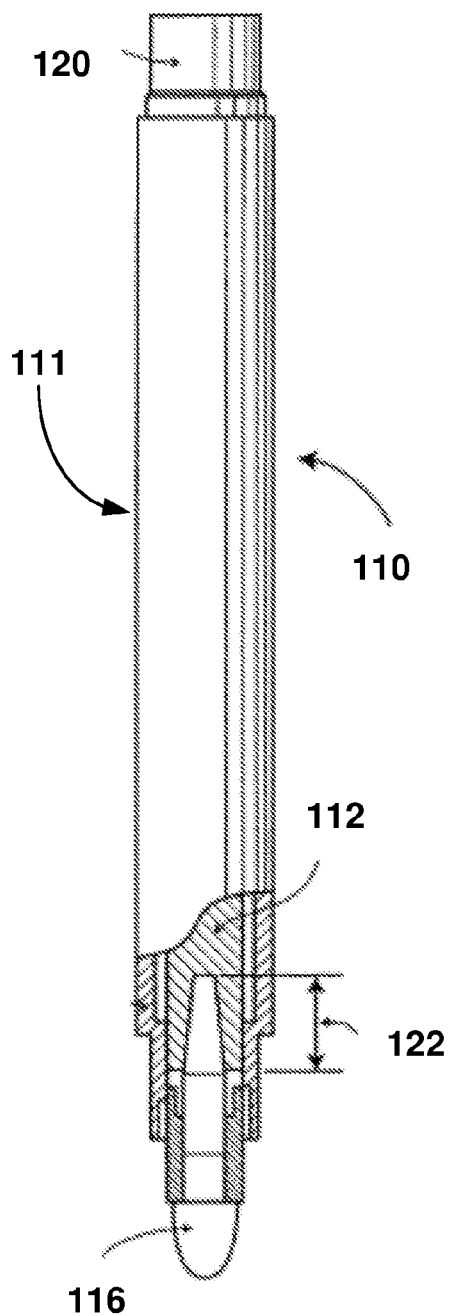

DRY ERASE INKS, AND ASSOCIATED METHODS AND WRITING INSTRUMENTS

CROSS-REFERENCE TO RELATED APPLICATIONS

This application is a national stage entry of International Application No. PCT/US2019/066179, filed Dec. 13, 2019, which claims priority benefit of U.S. Provisional Patent Application No. 62/779,541, filed Dec. 14, 2018.

FIELD OF THE DISCLOSURE

This disclosure generally relates to ink formulations, and associated methods and writing instruments, and more specifically relates to dry erase inks, and methods and writing instruments for using the same.

BACKGROUND

Dry erase ink formulations are known, and can be made in a wide variety of colors. However, different color pigments have different chemical and physical properties, and thus different dry erase ink formulations are required for different colorants. These different formulations often result in different colors of dry erase inks having different properties. For example, some colors erase better than others, dry more quickly than others, have better cap-off time, etc. These varying properties often frustrate users.

Accordingly, improved dry erase ink formulations and associated methods and writing instruments are needed.

SUMMARY

In one aspect, an ink formulation is provided, including a colorant encapsulated in a plurality of capsules, wherein the plurality of capsules include a release agent. For example, the release agent may be covalently bonded to the plurality of capsules.

In another aspect, a method of erasing ink is provided, including erasing an ink formulation from a whiteboard or other dry erase surface, wherein the ink formulation includes a colorant encapsulated in a plurality of capsules, wherein the plurality of capsules include a release agent.

In yet another aspect, writing instruments are provided, including a writing tip portion connected to a tubular member or refill, and an ink formulation including a colorant encapsulated in a plurality of capsules, wherein the plurality of capsules include a release agent.

BRIEF DESCRIPTION OF THE DRAWINGS

FIG. 1 illustrates a writing instrument according to an embodiment of the present disclosure.

DETAILED DESCRIPTION

Dry erase ink formulations, methods of using (e.g., erasing) dry erase ink formulations, and writing instruments including dry erase ink formulations are provided herein.

As used herein, the term "colorant" is used broadly to refer to a substance which imparts a desired color to an ink formulation. For example, a colorant may be a dye or pigment.

As used herein, "dry erase" when used to modify an ink formulation or portion thereof is used broadly to indicate that the ink formulation or portion thereof is configured to be applied to a whiteboard or dry erase board, and then later erased by rubbing or wiping without the need to apply any solvent.

As used herein, the term "erased" is used broadly to indicate that at least a portion of the colored components of an ink formulation has been removed from a substrate, or have been rendered colorless or transparent. As used herein, the phrase "substantially erased" is used broadly to indicate that substantially all of the colored components of an ink formulation have been removed from a substrate, or have been rendered colorless or transparent.

As used herein, "encapsulated" is used broadly to refer to a substance or core which is surrounded by a shell. For example, encapsulated materials include, but are not limited to, materials which are completely surrounded by an acrylic shell, such that the materials are isolated from any surrounding environment by the acrylic shell.

As used herein, "nanocapsules" is used broadly to refer to capsules having a maximum diameter of less than 1000 nanometers.

As used herein, "microcapsules" is used broadly to refer to capsules having a maximum diameter of from 1000 nanometers to about 1000 micrometers.

Dry Erase Ink Formulations

Dry erase ink formulations are disclosed herein. In some embodiments, the ink formulation may contain one or more colorants encapsulated in a plurality of capsules. In some embodiments, the ink formulations disclosed herein have a longer dry time than conventional dry erase markers. That is, when disposed on a surface, the ink formulations disclosed herein take longer to dry than comparative ink formulations wherein the colorant is not encapsulated in a plurality of capsules as described herein. In some embodiments, the ink formulations have described herein have a dry time of from about 30 seconds to about 120 seconds, for example about 30 seconds, about 40 seconds, about 50 seconds, about 60 seconds, about 70 seconds, about 80 seconds, about 90 seconds, about 100 seconds, about 110 seconds, about 120 seconds, and any ranges therebetween.

In some embodiments, the ink formulations disclosed herein have a longer cap off time when disposed in a marker type writing instrument than conventional dry erase markers. That is, when disposed in a dry erase marker and the marker tip is left uncapped, the ink formulations disclosed herein will have a longer cap off time than dry erase markers containing comparative ink formulations wherein the colorant is not encapsulated in a plurality of capsules as described herein. For example, in some embodiments, the ink formulations when disposed in a writing instrument having a marker tip, have an off cap time of more than 15 minutes, for example about 15 minutes, about 16 minutes, about 17 minutes, about 18 minutes, about 19 minutes, about 20 minutes, about 21 minutes, about 22 minutes, about 23 minutes, about 24 minutes, about 25 minutes, about 26 minutes, about 27 minutes, about 28 minutes, about 29 minutes, about 30 minutes, or any ranges therebetween.

In some embodiments, the colorants may include a solvent dye dissolved in an organic solvent. For example, the colorants may include Solvent 70 dissolved in Magiesol Oil 52, leucodyes dissolved in a fluid with an activator and a solid state wax, for example Crystal Violet dissolved in a phenolic resin and bees wax. In some embodiments, the colorants may include hydrophobically-treated colored pigments, such as hydrophobic carbon black, available from Degussa. In some embodiments, the ink formulation contains the colorant in an amount of from about 3 wt. % to about 80 wt. %, for example about 3 wt. %, about 5 wt. %, about 10 wt. %, about 20 wt. %, about 30 wt. %, about 40 wt. %, about 50 wt. %, about 60 wt. %, about 70 wt. %, or 80 wt. %, about 90 wt. %, about 90 wt. %, or any ranges therebetween.

In some embodiments, the plurality of capsules are acrylic capsules, melamine formaldehyde capsules, urea formaldehyde, ethyl cellulose, polyvinyl alcohol, gelatin, sodium alginate, or any combination thereof. In some embodiments, the capsules are nanocapsules or microcapsules.

In some embodiments, the encapsulated colorant is formed by the methods disclosed in U.S. Pat. No. 9,937,477, entitled "Encapsulation," the disclosure of which is hereby incorporated by reference herein in its entirety. In some embodiments, the encapsulated colorant is formed by the methods disclosed in U.S. Patent Publication No. 2017/0165627, entitled "Microencapsulation process," the disclosure of which is hereby incorporated by reference herein in its entirety. In some embodiments, to facilitate the formation of an insoluble wall, complementary catalytic curing agents such as tertiary amines, mercaptans, isocyanates, and phenols are used. In some embodiments, the encapsulation process involves cation chain polymerization, and complementary catalytic curing agents such as boron trifluoride complexes, complex aromatic salts of Lewis acids such as diaryl iodonium, triarylsulfonium, or arene diazonium are used. In embodiments in which the interfacial polymerization results in polar functionalities such as hydroxyl or amine groups, these functional groups may be further reacted with alkoxysilanes with long chain carbons to attach the long alkyl functionalities covalently onto the surface of the capsules.

In some embodiments, the plurality of capsules include one or more release agents. In some embodiments, the plurality of capsules include one or more release agents covalently bonded to a standard encapsulation material. For example, the release agent may include an epoxy, a polyester, a polyether, a urethane, a 2-(2-ethoxy) group, a 2-phenoxy group, a tetrahydrofurfuryl group, an ortho-phenoxy group, pentaerythriol, cyclic trimethylolpropane, an isobornyl group, a benzyl group, a 3,3,5-trimethylcyclohexyl group, or any combinations thereof covalently bonded to an encapsulation material. For example in some embodiments, the plurality of capsules include epoxy acrylate, polyester acrylate, polyether acrylate, urethane acrylate, 2-(2-ethoxyethoxy) ethylacrylate, 2-phenoxy ethyl acrylate, tetrahydrofurfuryl methacylate, ortho-phenoxy ethyl acrylate, pentaerythriol acrylate, cyclic trimethylolpropane formal acrylate, isobornyl acrylate, benzyl acrylate, 3,3,5-trimethylcyclohexyl acrylate, or any combinations thereof. In certain embodiments, the release agent is selected from: epoxy acrylate, polyester acrylate, polyether acrylate, and urethane acrylate release agents. For example, a suitable release agent may be selected based on the hardness, elasticity, toughness, abrasion resistance, adhesion, viscosity range, chemical resistance, and reactivity of the release agent for the specific application.

In some embodiments, the release agents identified above may be further modified to be compatible with the encapsulation process. For example, if the interfacial polymerization involves an anionic polymerization step, the release agent may include epoxy acrylate, polyester acrylate, polyether acrylate, or urethane acrylate modified with terminal epoxide functionalities.

In some embodiments, the ink formulation includes a resin. In some embodiments, the resin may include a variety of synthetic resin emulsions, such as aqueous dispersions of polyacrylic acid esters, styrene-acrylate copolymers, polyvinyl acetate, ethylene-vinyl acetate copolymers, ethylene methacrylic acid copolymers, α-olefin-maleic acid copolymers, silicone resins, polyester and polyurethane, water-soluble resins such as polyvinyl alcohols, polyvinyl pyrrolidone and polyvinyl butyral, alkali-soluble resins such as styrene-maleic acid copolymers, ethylene-maleic acid copolymers and styrene-acrylate copolymers, oil-soluble resins such as ketone resins, ketone-formaldehyde resins, amide resins, alkyd resins, rosin-modified resins, rosin-modified phenol resins, phenol resins, xylene resins, polyvinyl pyrrolidone, α- and β-pinene-phenol polycondensation resins, polyvinyl butyral resins and acrylic resins.

In some embodiments, the resin is an acrylic resin. In some embodiments, the acrylic resin is a water-based acrylic resin, for example Joncryl® 67, Joncryl® 678, Joncryl® 682, Joncryl® 683, or combinations thereof, which are all available from BASF®.

In some embodiments, the ink formulation includes the resin in an amount of from about 0 wt. % to about 50 wt. %, for example about 0 wt. %, about 10 wt. %, about 20 wt. %, about 30 wt. %, about 40 wt. %, or about 50 wt. %.

In some embodiments, the ink formulation includes a solvent. In some embodiments, the solvent is water. In some embodiments, the solvent is one or more alcohols, for example, benzyl alcohol, ethanol, n-propanol, n-butanol, diacetone alcohol, or combinations thereof. In some embodiments, the solvent is a water-soluble organic solvent, for example, ethanol, propanol, butanol, glycerin, sorbitol, triethanolamine, diethanolamine, monoethanolamine, ethylene glycol, diethylene glycol, thiodiethylene glycol, polyethylene glycol, propylene glycol, butylene glycol, ethylene glycol monomethyl ether, ethylene glycol monoethyl ether, ethylene glycol monobutyl ether, diethylene glycol monomethyl ether, diethylene glycol monoethyl ether, diethylene glycol monobutyl ethers propylene glycol monobutyl ether, ethylene glycol monomethyl ether acetate, sulfolane, 2-pyrrolidone, N-methyl-2-pyrrolidone and the like. In some embodiments, the solvent is an organic solvent, for example, naphtha, VM&P naphtha, refined solvent naphtha, petroleum sprit, xylene, methylisobutyl ketone, or butyl propionate.

In some embodiments, the ink formulation contains the solvent in an amount of from about 0 wt. % to about 80 wt. %, for example about 0 wt. %, about 10 wt. % solvent, about 20 wt. %, about 30 wt. %, about 40 wt. %, about 50 wt. %, about 60 wt. %, about 70 wt. %, about 80 wt. %, or any ranges therebetween.

In some embodiments, the ink formulation includes shear-thinning imparting agents, for example, nonionic surfactants having a specific HLB value, xanthan gum, welan gum, succinoglycan (organic acid-modified heteroglycan composed of glucose unit and galactose unit, having an average molecular weight of about 100 to 8,000,000), guar gum, locust bean gum, hydroxyethyl cellulose, alkyl alginates, polymers mainly composed of alkyl methacrylate and having a molecular weight of 100,000 to 150,000, glycomannan, hydrocarbons having a gelling ability and extracted from seaweed such as agar or carrageenan, benzylidenesorbitol or derivatives thereof, crosslinking acrylic acid polymers and the like, hydrophobically-modified ethoxylated urethane (HEUR) thickeners, alkalai-swellable emulsion (ASE) thickeners, hydrophobically-modified alkali-swellable emulsion (HASE) thickeners, associative thickeners, and non-associative thickeners are used alone or mixed in combination. In some embodiments, the ink formulation only includes shear-thinning imparting agents in an amount small enough to avoid affecting the Newtonian nature of the ink formulation. For example, in some embodiments, the ink formulation only includes shear-thinning imparting agents in an amount suitable to perform as a wetting agent.

In some embodiments, the ink formulation includes other additives such as pigments, binders, viscosity modifiers, thixotropic agents, preservatives, lubricants, pH adjustors, antiseptics or fungicides, wetting agents, defoamers, dispersants, surfactants, humectants, biocides, and the like.

In some embodiments, the ink formulation may be configured to be delivered from a marker type writing instrument, such as an Expo® marker.

Methods of Using/Erasing Dry Erase Ink Formulations

In some embodiments, methods of using and erasing dry erase ink formulations are provided. In some embodiments, any of the ink formulations described above is disposed on a whiteboard or dry erase surface (e.g., via contacting a writing instrument containing the ink formulation to the surface such that the ink is delivered from the instrument to the surface), and then the ink is removed by the surface by rubbing or wiping with an erasing instrument. In some embodiments, the erasing instrument comprises dry cloth or felt.

In some embodiments, the ink formulations may be considered erased when each formulation would be considered erased by an average consumer. Thus, in some embodiments, determining whether an ink formulation has been erased may involve a qualitative determination.

In some embodiments, the erasure of the ink formulations described herein may be evaluated using the Likert scale, wherein write test samples may be evaluated before and after attempted erasing on a 5-point scale. According to the Likert scale, 5 represents no color change, 4 represents slight discoloration, 3 represents moderate discoloration, 2 represents severe discoloration, and 1 represents complete color elimination. In some embodiments, the ink formulations may be considered erased when they are rated with a moderate discoloration, severe discoloration, or complete color elimination according to the Likert scale.

In some embodiments, the color of a surface with an ink formulation disposed thereon before and after erasure may be quantitatively evaluated with a color measurement instrument. In some embodiments the color measurement instrument may be a spectrophotometer, while in some embodiments the color measurement instrument may be a spectrodensitometer.

In some embodiments, color differences may be identified using the Commission Internationale de l'Eclairage (CIE) L*a*b* coordinates, wherein L* indicates lightness, a* is the red/green coordinate, and b* is the yellow/blue coordinate. The larger the L* value, the lighter the color, and the smaller the L* value, the darker the color. The larger the a* value, the redder the color, the smaller the a* value the greener the color. The larger the b* value, the yellower the b* value, and the smaller the b* value, the bluer the color. The color change of the ink formulation from its state before erasure ($L^*_1$, $a^*_1$, and $b^*_1$) and after erasure $L^*_2$, $a^*_2$, and $b^*_2$ can be indicated by calculating $\Delta L^*$, $\Delta a^*$, and $\Delta b^*$, according to the formulas below:

$$\Delta L^* = L^*_2 - L^*_1$$

$$\Delta a^* = a^*_2 - a^*_1$$

$$\Delta b^* = b^*_2 - b^*_1$$

A positive $\Delta L^*$ will indicate that the sample became lighter after erasure while a negative $\Delta L^*$ will indicate that the sample became darker after erasure. For example, a positive $\Delta L^*$ when measuring the effect erasure on a colored dry erase ink on a white substrate may indicate that the dry erase ink was lightened by erasure.

A positive $\Delta a^*$ will indicate that the sample became redder erasure, while a negative $\Delta a^*$ will indicate that the sample became greener after erasure. For example, a positive $\Delta a^*$ when measuring the effect of erasure on a green dry erase ink on a white substrate may indicate that the green color of the dry erase ink was at least partially removed by erasure.

A positive $\Delta b^*$ will indicate that the sample became yellower after erasure, while a negative $\Delta b^*$ will indicate that the sample became bluer after erasure. For example, a positive $\Delta a^*$ when measuring the effect of erasure on a blue colored dry erase ink on a white substrate may indicate that the blue color of the dry erase ink was at least partially removed by erasure. As would be readily understood by one of skill in the art, measuring $\Delta a^*$ and $\Delta b^*$ may be particularly useful in evaluating the erasability of dry erase inks which are initially red or blue in color.

The total color difference between all three coordinates L*, a*, and b* can be evaluated by calculating the total color difference, $\Delta E^*$, according to the formula below:

$$\Delta E^* = [\Delta L^{*\cdot 2} + \Delta a^{*\cdot 2} + \Delta b^{*\cdot 2}]/2$$

In some embodiments, the ink formulations may be considered erased when write test samples of the ink on a white substrate exhibit a $\Delta E^*$ value of from about 40 to about 100, a $\Delta L^*$ value of from about 1 to about 100, a $\Delta a^*$ value of from about +/−0.1 to about +/−90, a $\Delta b^*$ value of from about +/−0.1 to about +/−90, or any combination thereof, including any ranges therebetween. For example, in some embodiments, the ink formulations may be considered erased when write test samples of the ink on a white substrate exhibit a $\Delta E^*$ value of from about 40 to about 50, from about 50 to about 80, about 50, about 60, about 70, about 80, about 90, about 95, about 100, or any ranges therebetween. In some embodiments, the ink formulations may be considered erased when the write test samples of the ink on a white substrate exhibit a $\Delta L^*$ value of from about 5 to about 40, from about 40 to about 60, from about 50 to about 95, about 1, about 10, about 20, about 30, about 40, about 50, about 60, about 70, about 80, about 90, about 95, about 100, or any ranges therebetween. In some embodiments, the ink formulations may be considered erased when the write test samples of the ink on a white substrate exhibit a $\Delta a^*$ value of from about −60 to about 60, from about −60 to about −0.1, from about 0.1 to about 60, from about −25 to about −5, from about 5 to about 25, from about −60 to about −30, from about 30 to about 60, for example about −90, about −80, about −70, about −60, about −50, about −40, about −30, about −20, about −10, about 0, about 10, about 20, about 30, about 40, about 50, about 60, about 70, about 80, about 90, or any ranges therebetween. In some embodiments, the ink formulations may be considered erased when the write test samples of the ink on a white substrate exhibit a $\Delta b^*$ value of from about −90 to about −50, about 50 to about 90, about −40 to about −20, about 20 to about 40, about −20 to about −0.1, about 0.1 to about 20, about −90, about −80, about −70, about −60, about −50, about −40, about −30, about −20, about −10, about −0.1, about 0.1, about 10, about 20, about 30, about 40, about 50, about 60, about 70, about 80, about 90, or any ranges therebetween.

In some embodiments, the color of an ink formulation before and after erasure may be evaluated using the CIE L*C*h coordinates, where L* indicates lightness, C* indicates chroma, and h is the hue angle. The color change of the ink formulation from its state before erasure ($L^*_1$, $C^*_1$, and $h_1$) and after erasure $L^*_2$, $C^*_2$, and $h_2$ can be indicated by calculating $\Delta L^*$, $\Delta C^*$, and $\Delta h$, according to the formulas below:

$$\Delta L^* = L^*_2 - L^*_1$$

$$\Delta C^* = C^*_2 - C^*_1$$

$$\Delta h = h_2 - h_1$$

In some embodiments, the ink formulations may be considered erased when the ink disposed on a substrate before and after erasure exhibits a $\Delta L^*$ value of from about 1 to about 100, $\Delta C^*$ value of from about 0.1 to about 90, a $\Delta h$ value of from about 1° to about 360°, or any combination thereof, including any ranges therebetween. For example, in some embodiments, the ink formulations may be considered erased when the write test samples of the ink on a white substrate exhibit a $\Delta L^*$ value of from about 5 to about 40, from about 40 to about 60, from about 50 to about 95, about 1, about 10, about 20, about 30, about 40, about 50, about 60, about 70, about 80, about 90, about 95, about 100, or any ranges therebetween. In some embodiments, the ink formulations may be considered erased when the write test samples of the ink on a white substrate exhibit a $\Delta C^*$ value of 0.1 to about 20, about 25 to about 70, about 75 to about 90, about 0.1, about 10, about 20, about 30, about 40, about 50, about 60, about 70, about 80, about 90, or any ranges therebetween. In some embodiments, the ink formulations may be considered erased when the write test samples of the ink on a white substrate exhibit a $\Delta h$ value of about 1°, about 30°, about 60°, about 90°, about 120°, about 150°, about 180°, about 210°, about 240°, about 270°, about 300°, about 330°, about 360°, or any ranges therebetween.

Writing Instruments

In some embodiments, writing instruments are provided. In some embodiments, the writing instruments include a writing tip portion connected to a tubular member or refill, and any of the ink formulations described above. In some embodiments, the writing tip portion is a marker.

FIG. 1 shows a partial cutaway view of an embodiment of a writing instrument 110 according to the present disclosure. The writing instrument 110 includes a tubular body 111, which surrounds a reservoir 112, which may house any of the ink formulations described above. The writing instrument further includes a writing tip 116, which extends into the reservoir 112 by a distance 122. The tubular body 111 further includes a second end 120, which is configured to receive a cap (not shown).

While the disclosure has been described with reference to a number of embodiments, it will be understood by those skilled in the art that the invention is not limited to such disclosed embodiments. Rather, the invention can be modified to incorporate any number of variations, alterations, substitutions, or equivalent arrangements not described herein, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An ink formulation comprising a colorant encapsulated in a plurality of capsules, wherein the plurality of capsules comprises a release agent, where the release agent comprises epoxy acrylate, polyester acrylate, polyether acrylate, 2-(2-ethoxyethoxy) ethylacrylate, 2-phenoxy ethyl acrylate, tetrahydrofurfuryl methacylate, ortho-phenoxy ethyl acrylate, pentaerythriol acrylate, cyclic trimethylolpropane formal acrylate, isobornyl acrylate, benzyl acrylate, 3,3,5-trimethylcyclohexyl acrylate, or any combination thereof, wherein the ink formulation is a dry erase ink.

2. The ink formulation of claim 1, wherein the release agent is covalently bonded to the plurality of capsules.

3. The ink formulation of claim 1, wherein the ink formulation contains the colorant in an amount of from about 3 wt. % to about 100 wt. %.

4. The ink formulation of claim 1, wherein the colorant comprises a lueco dye, a color activating agent, and a reaction medium.

5. The ink formulation of claim 1, further comprising a solvent.

6. The ink formulation of claim 5, wherein the ink formulation is from about 20 wt. % to about 80 wt. % solvent.

7. The ink formulation of claim 6, wherein the solvent comprises an alcohol.

8. The ink formulation of claim 7, wherein the alcohol is benzyl alcohol, ethanol, n-propanol, n-butanol, diacetone alcohol, or a combination thereof.

9. The ink formulation of claim 1, further comprising a resin.

10. The ink formulation of claim 9, wherein the ink formulation is from about 10 wt. % to about 50 wt. % resin.

11. The ink formulation of claim 10, wherein the resin comprises an acrylic resin.

12. The ink formulation of claim 11, wherein the resin comprises a water-based acrylic resin.

13. A method of erasing ink comprising:
disposing the ink formulation of claim 1 on a whiteboard or dry erase surface; and
erasing the ink formulation by wiping the whiteboard or dry erase surface with an erasing instrument.

14. A writing instrument comprising:
a writing tip portion connected to a tubular member or refill; and
the ink formulation of claim 1.

15. A kit comprising:
the writing instrument of claim 14; and
an erasing instrument.

* * * * *